(12) United States Patent
Daly

(10) Patent No.: US 6,386,181 B1
(45) Date of Patent: May 14, 2002

(54) ELECTRONIC THROTTLE CONTROL SYSTEM WITH WIRELESS COMMUNICATION

(75) Inventor: Paul D. Daly, Troy, MI (US)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/650,576

(22) Filed: Aug. 30, 2000

Related U.S. Application Data
(60) Provisional application No. 60/154,390, filed on Sep. 16, 1999.

(51) Int. Cl.[7] .................................................. F02D 1/00
(52) U.S. Cl. ................... 123/399; 123/361; 123/339.12
(58) Field of Search ................................. 123/399, 361, 123/339.12

(56) References Cited

U.S. PATENT DOCUMENTS

| | | | | |
|---|---|---|---|---|
| 4,698,535 A | * | 10/1987 | Shiraki ........................ | 310/156 |
| 4,721,176 A | * | 1/1988 | Kabain et al. ............... | 180/197 |
| 5,624,100 A | * | 4/1997 | Bolte et al. .................... | 251/65 |
| 5,765,529 A | * | 6/1998 | Lee ............................. | 123/399 |

* cited by examiner

*Primary Examiner*—Bibhu Mohanty

(57) ABSTRACT

An electronic throttle control system for a vehicle utilizes wireless communication to provide command signals to a motor assembly that responsively drives the throttle control assembly. All communications between an accelerator pedal, a controller and the motor assembly preferably are wireless. Feedback information indicating motor operation or position information is provided to the controller through wireless communication. A power source for the motor assembly preferably is supported as part of the motor assembly so that no external wire connections are required. The power source preferably is provided with energy as a result of vibrations caused by vehicle operation or from a dedicated source of vibration.

20 Claims, 2 Drawing Sheets

ELECTRONIC THROTTLE CONTROL SYSTEM WITH WIRELESS COMMUNICATION

RELATED APPLICATIONS

This application claims priority to U.S. Provisional Application No. 60/154,390, which was filed on Sep. 16, 1999.

BACKGROUND OF THE INVENTION

This invention generally relates to vehicle throttle controls. More particularly, this invention relates to controlling an electronic throttle control using wireless communication.

Vehicle throttle bodies typically include an air intake opening. A blade is typically positioned within the opening and moved between opened and closed positions to control the amount of air intake. Conventional arrangements include mechanical linkages and springs to manipulate the position of the blade responsive to movement of the accelerator petal.

More recently, alternative arrangements have been proposed. One type of alternative replaces the mechanical linkages and springs with an electronic throttle control arrangement. One challenge facing the designers of such arrangements is how to accommodate the transmission of electrical power and signals needed to ensure adequate system performance. Wired connections in vehicles have historically proven to have several shortcomings and drawbacks. It is possible, for example, for wire connections to be broken or insufficient to provide proper communication. Additionally, wire harnesses have become increasingly difficult to design and maintain. With the increase of electronics and electrical components on vehicles, the associated challenges become even more difficult and expensive.

This invention provides a system and method for powering and operating an electronic throttle control assembly without requiring hard-wired connections.

SUMMARY OF THE INVENTION

In general terms, this invention is an electronic throttle body control system that utilizes wireless communication to power and control the system. A system designed according to this invention includes an electric motor that provides a motive force to selectively move throttle assembly components into a desired position. An electronic controller communicates with the electric motor and provides command information to the motor that is indicative of the desired motor operation. All communication between the controller and the motor is wireless. A feedback module provides position information regarding the throttle assembly components. The feedback module communicates with the controller using wireless communication.

The electric motor preferably is powered by a power source supported as part of the electric motor assembly so that no external wires are needed. The power source preferably is charged as a result of vibrations experienced by the power source. In one example, the vehicle engine serves as the source of vibrations.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
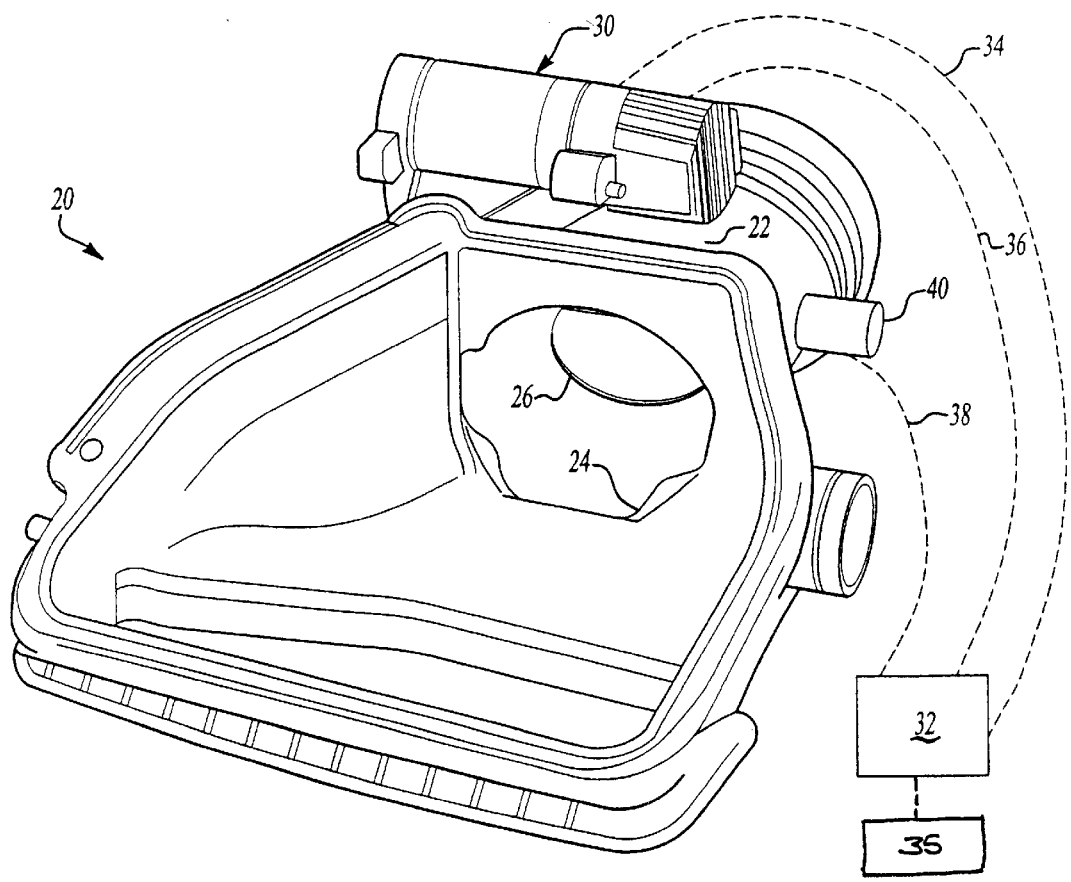
FIG. 1 diagrammatically illustrates a throttle assembly designed according to this invention.
Figure 2:
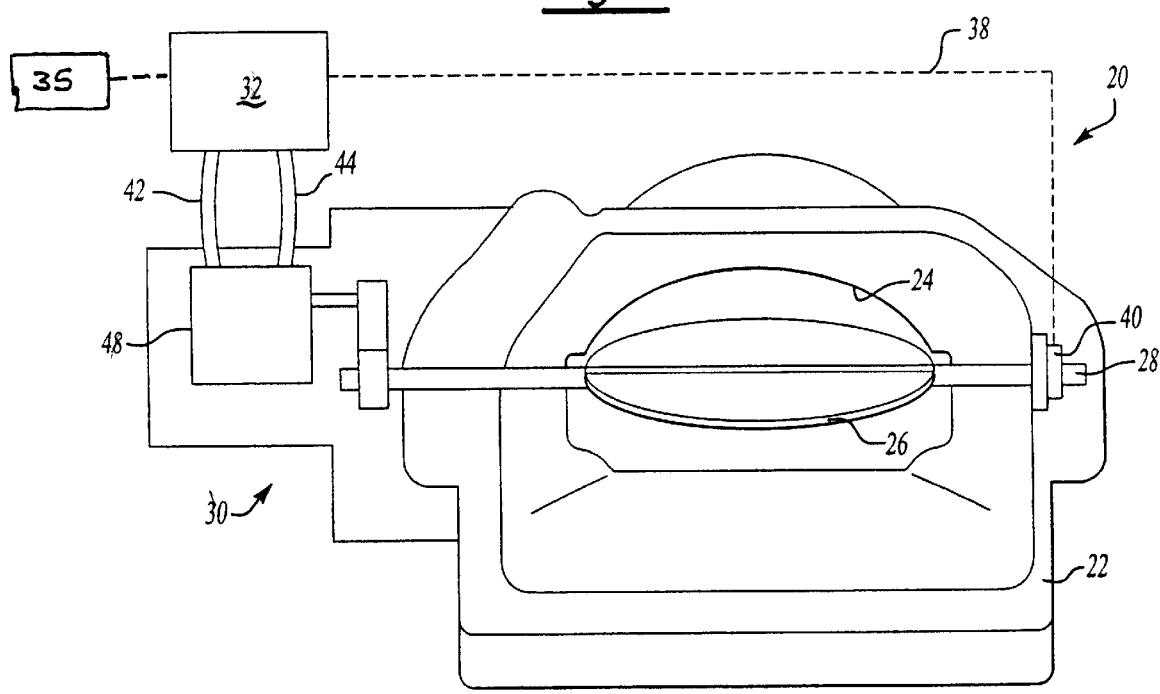
FIG. 2 shows a modified version of the example of FIG. 1 from another perspective.

FIGS. 1 and 2 show a throttle assembly 20 including a throttle body 22 having an air intake opening 24. A blade portion 26 is supported on a shaft 28 within the opening 24. The blade portion 26 is moved between opened and closed positions to control the amount of airflow into the opening 24.

An electric motor assembly 30 preferably manipulates the blade 26 into various positions within the opening 24. An electronic controller 32 controls the motor assembly 30 to provide the proper motive force for moving the blade 26 into a desired position.

The controller 32 communicates with the motor assembly 30 through wireless communication, schematically illustrated at 34 and 36. In the illustrated example, the wireless communication at 34 provides command signals or command information to the motor assembly 30 from the controller 32. The wireless communication at 36 provides position feedback information to the controller 32 from the motor assembly 30. The motor assembly 30 and the controller 32 each preferably include a transmitter and a receiver to facilitate two-way communication as illustrated.

An accelerator pedal 35 also communicates with the controller 32 using wireless communication. In one example, the accelerator 35 has a transmitter to actively send signals to the controllers 32. In another example, the accelerator 35 is passive and includes a reflective portion that reflects back signals to the controller 32, which originate from a transmitter portion of the controller 32. Reflective accelerator portions work best with radio frequency or sonic based systems.

Although the accelerator 35 and the controller 32 are schematically illustrated as separate components, they may be integrated into a single assembly. Whether the accelerator pedal 35 is remote from the controller 32 or combined with the latter, wireless communication is preferred to avoid external, hard wired connections between remote components.

The system 20 preferably includes sensors 40 that provide position information feedback to the controller 32 using wireless communication at 38. In the illustrated example only one potentiometer 40 is schematically shown for purposes of illustration, but those skilled in the art will appreciate that multiple sensors are preferred for redundancy.

The wireless communications used with this invention may take several forms. In one example, radio frequency signals are used. Microwave, infrared and surface wave acoustic technology are other examples of possible signal formats. Those skilled in the art who have the benefit of this description will be able to choose the appropriate format to suit the needs of their particular situation.

FIG. 2 illustrates another form of wireless communication used in a system designed according to this invention. Communication tubes 42 and 44 serve as conduits for ultrasound waves that carry the command signals and feedback information between the motor assembly 30 and the controller 32. Similar arrangements are useful for communication between the controller 32 and the accelerator 35. Sound waves other than ultrasound may also be used in some implementations of this invention.

Figure 3:
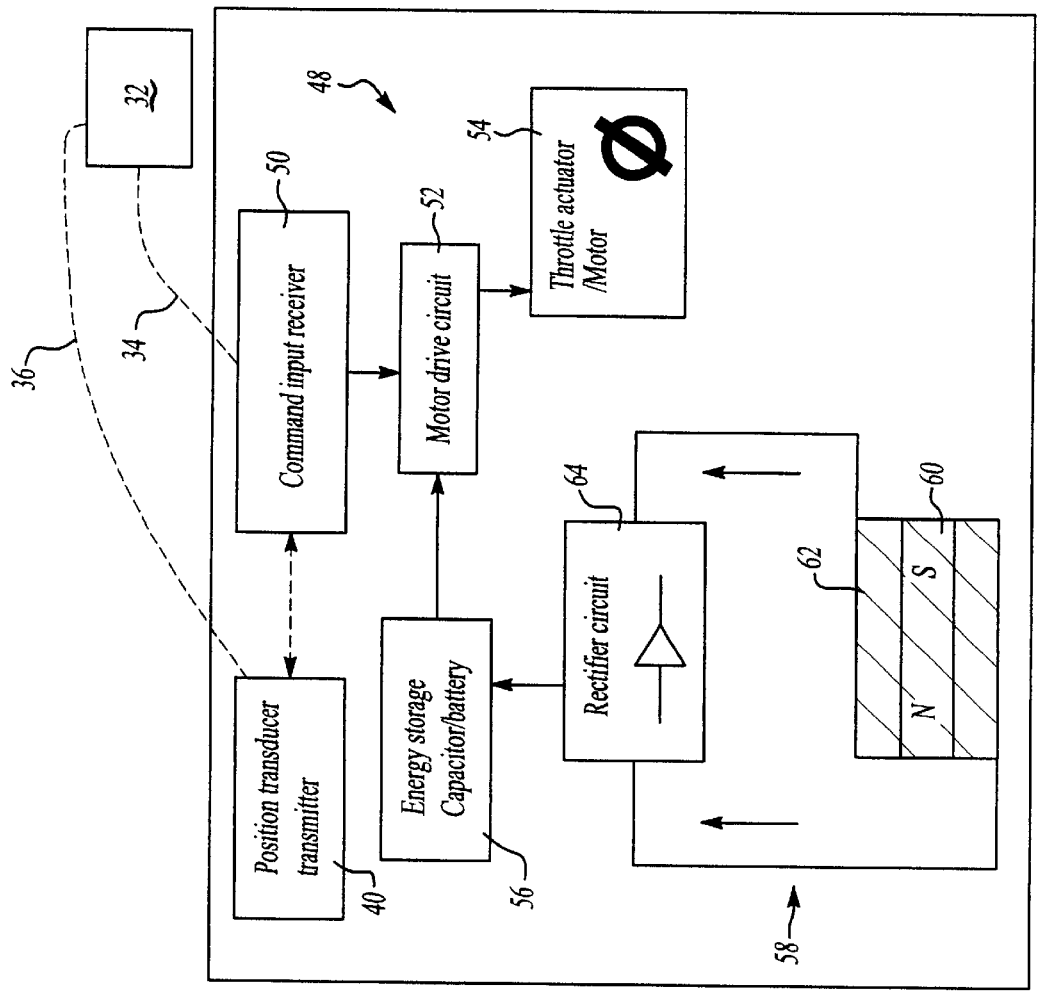
FIG. 3 schematically illustrates a system designed according to this invention.
Figure 3:
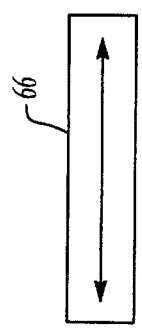

The motor assembly 30 preferably includes a control module 48. FIG. 3 schematically illustrates portions of the control module 48. A receiver 50 receives the command signal from the controller 32. A motor drive circuit 52 operates responsive to the information received by the receiver 50. The actuator or motor drive components move based upon the operation of the drive circuit 52.

Power preferably is provided by a power source 56 that is most preferably packaged as part of the motor assembly 30 so that no external wiring or other connections are required to provide power to the motor portion 54. In the illustrated example, the power source 56 is recharged over time with vehicle operation. A charging module 58 includes a current source, which comprises a magnet 60 and a coil 62 in the illustrated example. The coil 60 preferably is supported in the motor assembly 30 such that whenever the magnet 60 experiences vibrations, it moves relative to the coil 62. Such relative motion produces current. A rectifier circuit 64 preferably is included to ensure that all current generated by the magnet and coil arrangement is provided to charge or recharge the power source 56.

The same power source, or one that is similar preferably is used to provide power to the controller 32. Using a conventional battery power source for the controller 32 will suffice in some circumstances.

A vibration inducer 66 preferably is provided to ensure that current is generated and the power source 56 remains adequately charged to power the motor portion 54. In one example, the vehicle engine serves as the vibration source 66. Alternative arrangements, such as using a piezoelectric element as the current producing portion, are within the scope of this invention.

This invention provides wireless communication and power to an electronic throttle control assembly. The inventive arrangement avoids the use of additional wires to power and control the throttle control assembly, which simplifies the assembly and installation of the system along with enhancing other economies. It is most preferred to use known encryption techniques to encrypt the wireless communication used as part of this invention. Encryption eliminates potential interference from outside sources or nearby vehicles with similar systems.

The preceding description is exemplary rather than limiting in nature. Variations and modifications to the disclosed embodiments may become apparent to those skilled in the art that do not necessary depart from the spirit or purview of this invention. The scope of legal protection given to this invention can only be determined by the following claims.

I claim:

1. An electronic vehicle throttle control system, comprising:
    an electric motor assembly that provides a motive force to move a throttle blade portion; and
    a controller that controls operation of the electric motor assembly by providing command information to the motor assembly using wireless communication, the controller receiving feedback regarding the operation of the motor assembly using wireless communication.

2. The system of claim 1, including a power source and a motor portion within the motor assembly and wherein the power source is charged by a charging module supported as part of the motor assembly.

3. The system of claim 2, wherein the charging module includes a magnet and a coil generally surrounding the magnet and wherein vibrations of the magnet induce movement of the magnet relative to the coil to produce current that is used to charge the power source.

4. The system of claim 3, including a vibration inducer to cause the magnet to move relative to the coil.

5. The system of claim 4, wherein the vibration inducer is an engine on the vehicle.

6. The system of claim 1, wherein the wireless communication includes signals selected from at least one member of the group including ultrasound, radio frequency radiation, surface wave acoustics, and infrared.

7. The system of claim 6, wherein ultrasound is used and the system includes conduits extending between the controller and the motor assembly to carry the ultrasound signals.

8. The system of claim 1, wherein the motor assembly includes a motor transceiver and the controller includes a controller transceiver and wherein the transceivers transmit the wireless communications between the motor assembly and the controller, respectively.

9. The system of claim 1, wherein the controller is supported on the vehicle remotely from the motor assembly.

10. The system of claim 1, including an accelerator that communicates with the controller using wireless communication.

11. The system of claim 10, wherein the accelerator includes a reflector portion that reflects signals back to the controller that originate from the controller.

12. A method of controlling an electronic throttle control assembly for a comprising the steps of:
    (A) providing a electronic throttle control assembly includes a motor assembly and a controller that is located remotely from the motor assembly, that on the vehicle;
    (B) providing control signals indicative of a desired motor operation from the controller to the motor assembly using wireless communication; and
    (C) providing signals indicative of motor operation to the controller using wireless communication.

13. The method of claim 12, including using ultrasound.

14. The method of claim 12, including using infrared radiation.

15. The method of claim 12, including using surface wave acoustics.

16. The method of claim 12, wherein step (C) includes determining a position of at least one motor assembly component and providing the position information to the controller.

17. The method of claim 12, including powering the motor assembly using a power source supported as part of the motor assembly, the power source being charged responsive to vibrations experienced by the motor assembly.

18. An electronic vehicle throttle control system, comprising:
    an electric motor that provides a motive force to move a throttle blade portion;
    a power source associated with the electric motor to provide power to the electric motor as needed;
    a charging device associated with the power supply, the charging device generating a current to charge the power supply responsive to vibrations experienced by the charging device; and
    a controller that controls operation of the electric motor by providing command information to the motor using wireless communication, the controller receiving feedback regarding operation of the motor assembly using wireless communication.

19. The system of claim 18, wherein the charging device includes a magnet and a coil surrounding at least a portion of the magnet, the magnet being supported to be movable relative to the coil such that movement of the magnet as caused by vibrations experienced by the charging device generates a current in the coil that is used to charge the power source.

20. The system of claim 18, wherein the charging device is supported relative to a vehicle engine so that vibrations of the engine cause vibration of the charging device.

* * * * *